June 17, 1941. C. J. GIBSON ET AL Re. 21,830

REFRIGERATING APPARATUS

Original Filed Dec. 16, 1937 2 Sheets-Sheet 1

Inventors:
Charles J. Gibson &
Jens Touborg,
By Chritton, Miles, Davis, Hindel & Dawson,
Attys.

June 17, 1941. C. J. GIBSON ET AL Re. 21,830

REFRIGERATING APPARATUS

Original Filed Dec. 16, 1937 2 Sheets-Sheet 2

Inventors:
Charles J. Gibson &
Jens Touborg,
By Christie, Miles, Davis, Hirschl & Dawson,
Attys.

Reissued June 17, 1941

Re. 21,830

UNITED STATES PATENT OFFICE 21,830

REFRIGERATING APPARATUS

Charles J. Gibson, Greenville, and Jens Touborg, Tecumseh, Mich., assignors to Gibson Electric Refrigerator Corporation, Greenville, Mich., a corporation of Michigan Original No. 2,158,718, dated May 16, 1939, Serial No. 180,248, December 16, 1937. Application for reissue June 7, 1940, Serial No. 339,406

10 Claims. (Cl. 62—103)

Figure 1:
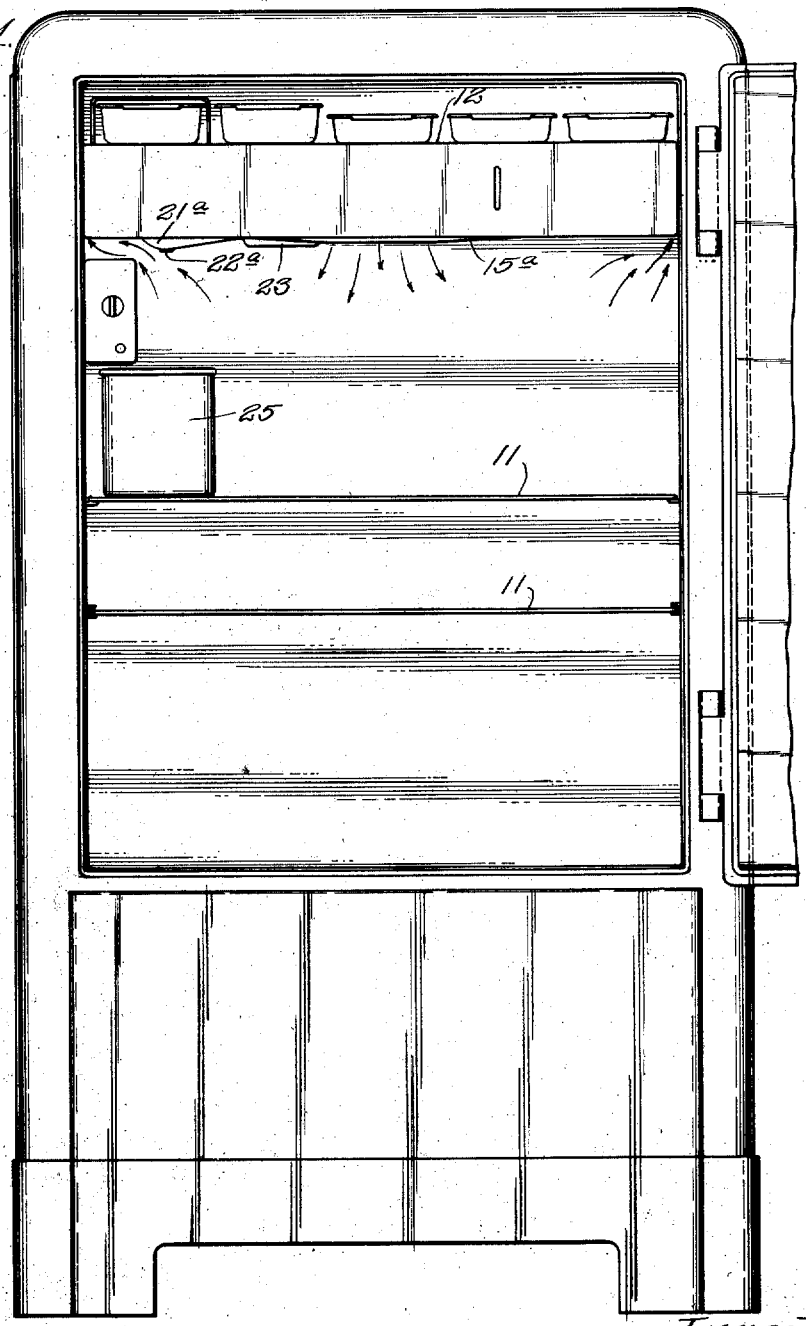

This invention relates to improvements in refrigerating apparatus and more especially to such apparatus of the portable type particularly adapted for domestic use.

Among the features of our invention is the provision of an evaporator in the form of a flat imperforate shelf located near the top of the cooling chamber, the shelf having substantially the same size and shape of a horizontal cross-section of the chamber itself. We have found that by this construction we are able to provide a space above the shelf for the accommodation of ice trays on the shelf and at the same time cool the compartment below the shelf.

Another feature of our invention is improved defrosting apparatus especially adapted for catching drippage from a flat type evaporator whether said evaporator is in the form of a shelf or not. Our improved defrosting apparatus can be used in connection with any horizontal, flat or plate type evaporator and even in connection with a construction where the ceiling of the storage or food compartment is itself chilled in order to form the evaporator or cooling unit for the refrigerator. In all evaporators or cooling units of this type which are relatively flat and large in area, difficulty has been encountered in catching the drippage therefrom especially during defrosting operations. Our invention contemplates primarily a drip baffle of relatively large area below such an evaporator or cooling unit and above the top-most food shelf. This baffle is provided with means for directing the drippage falling thereon to a certain point from which it is discharged through a suitable opening or spout below which is placed a relatively tall, deep drip receptacle which preferably may be supported on the top-most food shelf. The receptacle, being tall and deep, does not take up much room on the shelf.

Another feature of our invention is means for providing a certain amount of air circulation through the drip baffle to prevent or lessen undue frosting, sweating and drippage from the baffle itself. We have found, however, that even with such construction it may be necessary to place the baffle a more or less objectionable distance below the evaporator in order to prevent objectionable sweating and dripping. To further overcome this disadvantage, therefore, it is another feature of our invention to provide a plurality, for example, two drip baffles. Accordingly, we have shown our invention in the drawings in this form. One baffle may be mounted, for example, about two inches below the evaporator and tends itself to frost and drip. The drippage from it, however, is caught by the second baffle which needs to be only an inch or so beneath it. There is thus provided an apparatus which operates entirely satisfactorily as defrosting apparatus and at the same time requires a minimum amount of space beneath the evaporator.

Other features and advantages will appear more fully as we proceed with our specification.

In that form of device embodying the features of our invention shown in the accompanying drawings—

Figure 2:
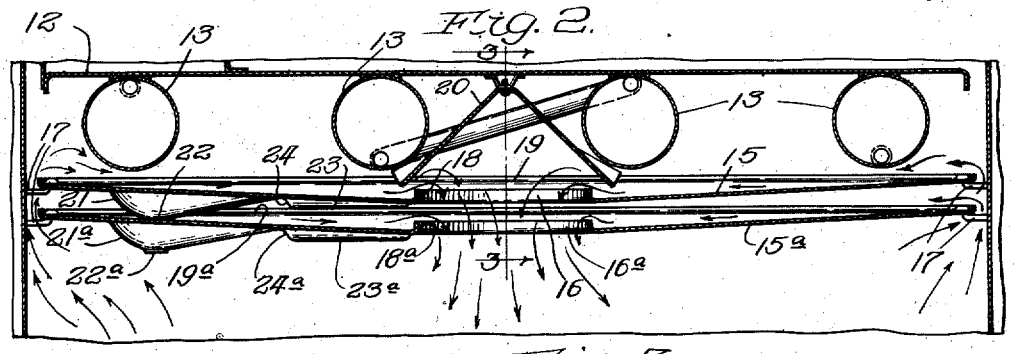
Figure 3:
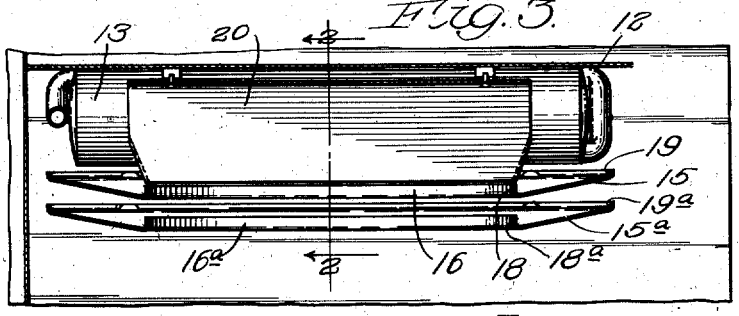
Figure 4:
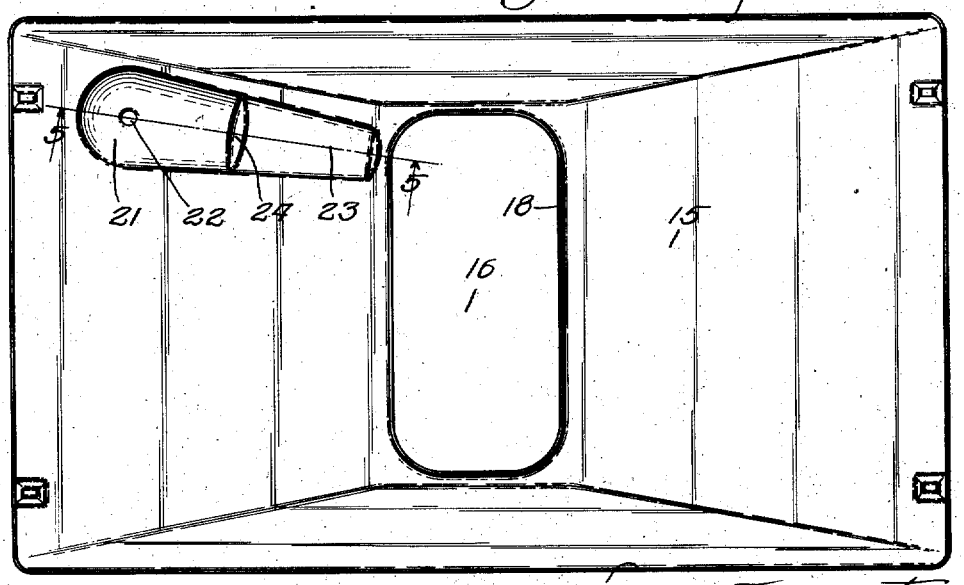
Figure 5:
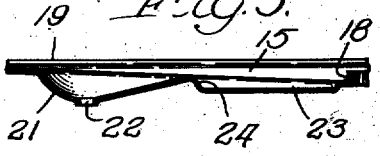

Fig. 1 is a view in front elevation of a refrigerator; Fig. 2 is an enlarged vertical sectional view of the evaporator and drip baffles taken as indicated by the line 2 of Fig. 3; Fig. 3 is a view taken as indicated by the line 3 of Fig. 2; Fig. 4 is a top plan view of one of the drip baffles; and Fig. 5 is a view taken as indicated by the line 5 of Fig. 4.

As shown in the drawings, 10 indicates the usual food compartment of a refrigerator which may be of any conventional type adapted for mechanical cooling. 11, 11 indicate the usual shelves in the compartment for supporting food.

In the refrigerating apparatus here shown, we have disclosed an evaporator of the flat or sheet type and have here shown the same embodied in an evaporator of such type serving also as a shelf, for example, similar to the evaporator shown in Figs. 10, 11, 12 and 13 of Touborg and Rosebrook Patent 2,009,910 issued July 30, 1935. Since the details of the construction and operation of such an evaporator are fully disclosed in that patent, it is unnecessary that they be repeated here.

The evaporator in general in the form of a flat shelf we have indicated by the reference numeral 12, and the cooling boilers thereunder by the reference numeral 13. We shall use the number 12 to indicate the evaporator in general, it being understood that in the practice of this invention we may employ any evaporator of the flat type lying substantially in a horizontal plane. Such an evaporator may be in the form of a shelf as shown or it could be in the form of a flat plate nearer the ceiling or roof of the food compartment, or the flat ceiling or top of the food compartment itself could constitute a part of the evaporator or cooling unit.

Under the evaporator 12 are placed upper and lower drip baffles 15 and 15a respectively, each being substantially the same size and shape as the plate 12 but preferably slightly larger so that any drip from the plate 12 or the boilers 13 will be caught by the upper baffle. The two baffles are provided with central openings 16 and 16ᵃ respectively, surrounded by upwardly turned rims 18 and 18ᵃ respectively, about ¼" high. The baffles 15 and 15ᵃ are preferably dished downwardly somewhat toward the central openings as shown; and the peripheries of the plates are also turned upwardly to form narrow upstanding flanges 19 and 19ᵃ. The baffles are supported from the walls of the cabinet on suitable pins or brackets 17, 17.

Above the openings 16, 16ᵃ the shelf 12 carries on its underside a baffle 20 like a gable roof in the form of an inverted V so that any water that may drip from the underside of the shelf 12 or the boilers 13 in the center will not fall through the openings 16, 16ᵃ in the baffles.

Any drippage that may occur from the baffle 15 because of defrosting, or sweating, or otherwise, will be caught by the baffle 15ᵃ.

A pan-shaped baffle tends to obstruct the recirculation of air between the evaporator surface and the food compartment to such an extent that the baffle itself tends to become cold enough to frost and sweat and cause a certain amount of drippage. We have overcome this objectionable tendency by two separate and distinct features. The first is the provision of means in the baffle 15 to permit some circulation of air through it, such means being here shown as a central opening 16. This provides a drip baffle which does not so seriously interfere with the circulation of air between the evaporator and food compartment as would be the case if the baffle were absolutely imperforate. There may be one relatively large opening as shown or a plurality of smaller openings, so shaped and spaced to permit a regulated amount of air circulation through the baffles. Even with such means to permit circulation of air the baffle would have to be some distance below the evaporator if a single baffle were used. In order to permit placing the baffle somewhat closer to the evaporator we provide the second distinct and separate improvement of employing a second drip baffle 15ᵃ below the upper baffle 15. Consequently any drippage from the upper baffle 15 is caught by the lower baffle 15ᵃ. With this construction, the baffles may be close together and both relatively close to the evaporator so as not to interfere seriously with storage of food on the top shelf. For example, we have found that the upper baffle may be about two inches below the evaporator and the lower baffle about one inch below the upper baffle.

We shall now describe the means for catching the water from the melting frost and ice on the evaporator. Heretofore it has been customary to provide a tray under the evaporator to catch the water during the defrosting operation. The tray ordinarily has been large enough to catch water dripping from any part of the evaporator; and it has been customary to place the tray on the uppermost food shelf under the evaporator. This construction was fairly satisfactory in cases where the evaporator surface was predominantly vertical so that the area of a horizontal projection of the evaporator was relatively small. In such cases the tray did not need to be very large in area and consequently did not occupy an undesirable amount of shelf space. There has been developed, however, a type of evaporator having a relatively large horizontal surface area that has recently come into more popular use. For example, as here shown, the evaporator includes a relatively large flat horizontal plate 12 here shown in the form of a flat shelf having an area substantially the same as the horizontal cross-sectional area of the entire food compartment. With such a large flat evaporator, according to the old method of catching the melting frost, a large tray would be required. That is, the tray would have to have an area substantially equal to the entire area of the upper food shelf. It will be seen, therefore, that such a tray standing on the shelf would greatly restrict the food storage capacity of the refrigerator.

The horizontal flat type evaporator has distinct advantages over the older types. For example, as here shown it can serve as a shelf for the support of ice trays or food, thereby rendering possible a more efficient utilization of space within the refrigerator for the storage of food, and also providing a relatively larger freezing surface, greater convenience for the freezing or chilling of certain foods, and an improvement in the appearance of the interior of the refrigerator. As stated before, such a horizontal type evaporator may also serve as a ceiling of the food compartment or as a flat plate at or near the ceiling, thereby to render possible more efficient utilization of space within the refrigerator for the storage of food and an improvement in the appearance of the interior of the refrigerator.

By the use of our invention, a horizontal flat type evaporator can be employed and the water from melting frost caught in a receptacle that occupies only a very small portion of the area of the upper shelf. This is accomplished by providing one or more relatively large flat baffles, as here shown, which are suitably dished and provided with rims so that these baffles will direct the water falling thereon to one point where the baffle is provided with a suitable discharge opening or spout. As here shown, the baffles are dished and described in the earlier part of the specification and the two baffles are provided at the corners with the sumps 21 and 21ᵃ respectively, said sumps being provided with drainage openings 22 and 22ᵃ respectively.

The baffles are also provided with smaller or auxiliary sumps 23 and 23ᵃ respectively, separated from the main sumps by dams 24 and 24ᵃ respectively. We shall now describe the purpose of these auxiliary sumps. The baffle next to the evaporator frosts to a certain extent and tends to defrost and drip just a trifle on the off-cycle when the control is on the warm setting. If it were not for the auxiliary sump, it would be necessary to keep the drip receptacle, to be hereinafter described, in place all the time because of these few drops of drippage from the upper baffle on every off-cycle. The auxiliary sump, however, is large enough to hold this small amount of off-cycle drippage until the next on-cycle at which time it evaporates and returns to frost on the evaporator, thus rendering it possible to move the drip receptacle, to be hereinafter described, and use the refrigerator without it until the defrosting of the entire evaporator.

25 indicates a drip receptacle preferably made of glass resting on the upper food shelf 11 and located just below the discharge opening 22ᵃ in the lower baffle. This receptacle is made relatively tall and deep with a relatively small cross-sectional area. Being removably located on the upper shelf it is easily accessible for cleaning and emptying purposes. Being relatively small in cross-sectional area, it occupies only a small portion of the shelf 11, thus making a major part of the shelf available for storage of food and other articles to be kept cool.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. In combination with a refrigerator having a food compartment: a horizontal surface type evaporator in the food compartment, said evaporator including an element in the form of a flat horizontally disposed plate forming a shelf in the food compartment, said plate having substantially the same cross-sectional area as the horizontal cross-sectional area of the food compartment; a food shelf below the evaporator; a drip baffle above the food shelf and below the evaporator, said drip baffle extending generally in parallelism with said plate and having a discharge opening; and a relatively tall deep drip receptacle with a relatively small cross-sectional area supported on said food shelf under said discharge opening.

2. Apparatus as claimed in claim 1 in which the drip baffle is relatively close to the evaporator compared to its distance from the food shelf.

3. Refrigerating apparatus, including: an evaporator; and a drip baffle below the evaporator, said drip baffle having a main sump with a discharge opening therein and an auxiliary sump separated from the main sump by a dam.

4. Apparatus as claimed in claim 1 having a plurality of drip baffles (including the one specified in claim 1) above the food shelf and below the evaporator, the lowermost drip baffle adapted to catch water dripping from the baffle or baffles above it and provided with said discharge opening.

5. In combination with a refrigerator having a food compartment: a horizontal surface type evaporator in the food compartment, said evaporator including an element in the form of a flat horizontally disposed plate forming a shelf in the food compartment, said plate having substantially the same cross-sectional area as the horizontal cross-sectional area of the food compartment; a food shelf below the evaporator; a drip baffle above the food shelf and below the evaporator, said drip baffle extending generally in parallelism with said plate and having a discharge opening; and a relatively tall deep drip receptacle with a relatively small cross-sectional area adapted to receive water discharged from the discharge opening in the drip baffle.

6. Apparatus as claimed in claim 5 in which the drip baffle has an opening to permit circulation of air therethrough.

7. In combination with a refrigerator having a food compartment: an evaporator having a horizontally disposed portion forming a shelf in the food compartment, the horizontal area of the evaporator being substantially the same as the horizontal cross-sectional area of the food compartment; a food shelf below the evaporator; and a drip baffle arrangement above the food shelf and below but quite near the evaporator, the baffle arrangement extending generally in parallelism with the portion forming said first-mentioned shelf having an area larger than that of the evaporator and being constructed to cause the condensate dripping from the evaporator to be concentrated at one point and having a discharge opening at said point, the arrangement comprising drip baffles superimposed one over the other and so separated as to prevent any substantial transfer of heat therebetween.

8. Apparatus of the chairacter claimed in claim 7, wherein the baffle arrangement comprises upper and lower metal sheets arranged in close juxtaposition, but having an air space therebetween.

9. Apparatus of the character claimed in claim 7, wherein at least the lower baffle has upwardly extending flanges at the outer edges thereof.

10. Apparatus of the character claimed in claim 7, wherein the baffle arrangement does not extend completely to the side walls of the food compartment and has a large central opening, whereby good circulation of air between the evaporator and the food shelf is permitted.

CHARLES J. GIBSON.
JENS TOUBORG.